United States Patent [19]

Hinman

[11] Patent Number: 4,727,422
[45] Date of Patent: Feb. 23, 1988

[54] METHOD AND APPARATUS FOR EFFICIENTLY COMMUNICATING IMAGE SEQUENCE HAVING IMPROVED MOTION COMPENSATION

[75] Inventor: Brian L. Hinman, Lynn, Mass.

[73] Assignee: PictureTel Corporation, Peabody, Mass.

[21] Appl. No.: 740,897

[22] Filed: Jun. 3, 1985

[51] Int. Cl.$^4$ ............................ H04N 7/12; H04N 7/18
[52] U.S. Cl. ..................................... 358/133; 358/105; 358/135; 358/138
[58] Field of Search ............... 358/105, 133, 135, 136, 358/138

[56] References Cited

U.S. PATENT DOCUMENTS

| | | | |
|---|---|---|---|
| 3,632,865 | 1/1972 | Haskell | 178/6 |
| 4,237,484 | 12/1980 | Brown et al. | 358/142 |
| 4,281,344 | 7/1981 | Mounts et al. | 358/136 |
| 4,302,775 | 11/1981 | Widrgreen et al. | 358/136 |
| 4,338,272 | 7/1982 | Netravali et al. | 358/136 |
| 4,383,272 | 5/1983 | Widergreen et al. | 358/136 |
| 4,394,774 | 7/1983 | Widergreen et al. | 382/56 |
| 4,447,886 | 5/1984 | Meeker | 364/725 |
| 4,575,756 | 3/1986 | Furukawa | 358/136 |

OTHER PUBLICATIONS

Jain et al, "Displacement Measurement and its Application in Interframe Image Coding," *IEEE Transactions on Communications*, vol. COM-29, No. 12, Dec. 1981, pp. 1799-1808.

Koga et al, "Motion-Compensated Interfame Coding for Video Conferencing," CH1679-0/81/000-0312, 1981 IEEE, G5.3.1-G5.3.5.

Koga et al, "Motion-Compensated Adaptive Intra-Interframe Predictive Coding Algorithm," CH2118-8/85/0000-0363, 1985 IEEE, 10.7.1-10.7.4, p. 363-366.

Ericsson, "Motion-Compensation Hybrid Coding at 50 Kb/s, " CH2118-8/85/0000-0367, 1985 IEEE, 10.8.1-10.8.8, pp. 367-370.

*Primary Examiner*—E. A. Goldberg
*Assistant Examiner*—Patrick W. Foster
*Attorney, Agent, or Firm*—Lahive & Cockfield

[57] ABSTRACT

An image sequence transmission method and apparatus transmit a sequence of images over a communications channel to a receiver. The transmitter has circuitry for estimating, for successive images of the sequence, a measure of the motion displacement vector field for block regions of an image. The transmitter further has coding circuitry for representing each sequentially generated measure as a coded motion vector field, circuitry for generating an error reconstruction signal using the coded motion vector field, and coding circuitry for transmitting the coded motion vector field and the error reconstruction signal over the channel. The error signal generation circuitry has, in particular a motion reconstruction circuit for generating motion reconstruction displacement signals for each block of an image in response to the coded motion vector field, and a motion vector field interpolator for generating from the motion vector field decoded signals, displacement signals for each picture element of the image. A motion compensation circuit responds to the displacement vectors for each image for modifying a receiver estimated image thereby constructing the image which the receiver is expected to generate.

16 Claims, 11 Drawing Figures

METHOD AND APPARATUS FOR EFFICIENTLY COMMUNICATING IMAGE SEQUENCE HAVING IMPROVED MOTION COMPENSATION

BACKGROUND OF THE INVENTION

The invention relates generally to a method and apparatus for transmitting sequences of images through a communications channel, and in particular, to a method and apparatus for providing improved motion compensation to the image sequence transmission process.

The transmission of sequences of images, and in particular sequences of naturally occurring images such as those represented by a television signal, has been the subject of a significant amount of investigation. Typically, investigators have relied upon the highly redundant nature of successive images in the sequence and have often modeled the image data as a three-dimensional Markov process with a correlation coefficient close to unity. The Markov model provides a motivation for utilizing differential pulse-code-modulation (DPCM) and transform coding techniques to take account of the interframe redundancy.

By analyzing the nature of typical moving video, it is easy to become convinced that the principal change occurring between successive frames is the inhomogeneous motion of the objects within the frame. It has also been recognized that an accurate apparatus and method of estimating and compensating for this spatially dependent motion enables the construction of an interframe data compression method and apparatus which can have substantially better performance than can be achieved by sending a signal representative merely of the difference between successive frames.

As a result, various motion compensating coding methods and apparatus have been developed. These systems typically are either receiver-based motion compensation systems or transmitter-based motion compensation systems. In the receiver-based motion compensation system, the receiver makes a prediction as to the motion and compensates the previous frame for the expected motion. The transmitter, operating in the same manner, then sends only an error signal describing what must be done at the receiver in order to correct the receiver predicted frame. The error signal is typically coded in order to reduce its bandwidth.

For a transmitter-based motion compensation system, the motion estimation process occurs only at the transmitter. Displacement vectors are generally determined over various regions of the image and this data is then transmitted to the receiver along with an error information data signal. At the receiver the compensation process is performed on the previously coded image first using the motion information provided by the transmitter. The error signal data provided by the transmitter is then added to the thus compensated receiver image in order to maintain picture quality.

Unfortunately, however, both of these systems are flawed in the manner in which they are implemented. One disadvantage of receiver-based motion compensation systems is that they are, by their very nature, predictive coding systems. Because the prediction is based upon picture elements which have already been transmitted and hence received, the receiver-based motion compensation coder does not have the ability to deterministically optimize the estimate which they make of the "displacement," i.e., the motion. Thus, a receiver-based motion compensation system using a traditional raster scanning procedure, which receives a sequence wherein a object is moving rapidly toward an upper left-hand portion of the image, cannot always properly compensate therefor. Thus, when the previous frame and the local picture elements in the present frame are found to have no displacement, and the prediction method will assume no displacement for the next picture element in the raster. However, since the next picture element has in fact been displaced many picture elements toward the upper left-hand portion of the image, a very large prediction error results. A transmitter-based motion compensation system, with knowledge of the entire image, would have avoided the error by deterministically selecting the displacement estimate which minimizes the actual error.

Another major disadvantage of receiver-based motion compensation systems is that they typically employ a differential pulse-code-modulation (DPCM) representation of the error signal. A traditional DPCM system employs a coding limit of one bit per picture element, since data is transmitted for each picture element. This limitation is avoided in motion compensation systems by first segmenting the image into its moving and non-moving parts. Then, entropy coded address information is transmitted to inform the receiver of the specific regions over which an error signal will be sent. In non-moving regions, no error information need be sent. Unfortunately, however, the amount of addressing information for such a DPCM system can often exceed an allowable, reasonable limit.

The major disadvantage of transmitter-based motion compensation systems which provide good image reproduction is that they require substantial overhead data to describe the motion vector field which is typically sent in PCM form. This problem is exacerbated when it is desired to have a high resolution representation of the vector field.

Many motion estimation methods associate with each pixel of the image a motion displacement vector which describes the movement of that pixel from one image to another. And some motion estimation methods provide, in the spatial-domain, information regarding the movement of a block or region of pixels from one frame to the next. When these methods are employed in connection with transmitter-based motion estimation systems, it is necessary to create at the transmitter a replica of the image which will be produced at the receiver.

The process of creating the estimated receiver image at the transmitter makes use of the motion estimation signal output either directly, or after coding. During this process, however, both the large amount of data provided when each pixel of the image has associated with it a motion vector, and the relatively coarse motion estimation definition provided for blocks or regions of an image, (with concomitant lower data requirements) have proved unsatisfactory. On the one hand, providing motion estimation data for each pixel is computationally inefficient and results in significant noise artifacts. The provision of the coarser motion estimation process has resulted in inaccuracies and imprecision in the resulting received images.

Accordingly, it is an object of the present invention to provide a motion compensation method and apparatus having high resolution without incurring the disadvantages of noise induced artifacts and large computational load. Other objects of the invention are an improved motion compensation method and apparatus which provide high image quality, ease of computation, and ease of implementation.

SUMMARY OF THE INVENTION

The invention relates to an image sequence transmission system for transmitting a sequence of images over a communications channel. This system has estimating circuitry for estimating, for successive images of the sequence, a measure of the motion displacement of block regions of an image and further has coding circuitry for representing the generated measures of an image as a coded motion signal representation. This system further has circuitry for generating, using the coded motion signal representation, an error reconstruction signal; and for transmitting the error reconstruction signal and the coded motion signal representation over the channel.

An improved error signal generating circuitry features a motion reconstruction circuitry for generating motion reconstruction displacement signals for each block of the image in response to the coded motion signal representation; a motion field interpolator for generating, in response to the displacement signals, a displacement vector for each picture element of the image; and a motion compensator responsive to the motion field interpolator for modifying a receiver estimated previous image for constructing an estimated receiver image.

In various aspects of the invention, the interpolator can use, depending upon the computational load and "smoothness" requirements of the system, either a raised cosine interpolation function, a linear interpolation function, or a trapezoidal interpolation function.

In another aspect, the system further has a receiver having construction circuitry for constructing an error image representation from a received error reconstruction signal, circuitry for constructing a motion field measure for the image from a received coded motion signal representation, and circuitry responsive to the received error image representation and the receiver motion field measure for generating a reconstructed image sequence. The receiver further features a receiver motion field interpolator for generating, in response to the received coded motion signal representation, a displacement vector for each picture element of an image to be constructed, and a receiver motion compensation loop responsive to the motion field interpolator and the error constructing circuitry for generating an image sequence.

The image sequence transmission method features an improved error signal generating method having the steps of generating motion block reconstruction signals in response to the a coded motion signal representation; interpolating, in response to the blocked reconstruction displacement signals, a displacement vector for each picture element of the image; and constructing an estimated receiver image from the interpolated motion reconstruction signal and a receiver estimated previous image.

In various aspects, the improved method provides for different interpolation functions such as a raised cosine interpolation function, a linear interpolation function, and a trapezoidal interpolation function. The method can further provide, at a receiver, an improved sequence generating method having the steps of interpolating a received coded motion signal representation of the block displacements for generating a displacement vector for each picture element of the image to be reconstructed; and generating an image sequence from the interpolated motion field and a received error signal representation.

BRIEF DESCRIPTION OF THE DRAWINGS

Other objects, features, and advantages of the invention will appear from the following description of particular preferred embodiments taken together with the drawings in which.

DESCRIPTION OF PARTICULAR PREFERRED EMBODIMENTS

Figure 1:
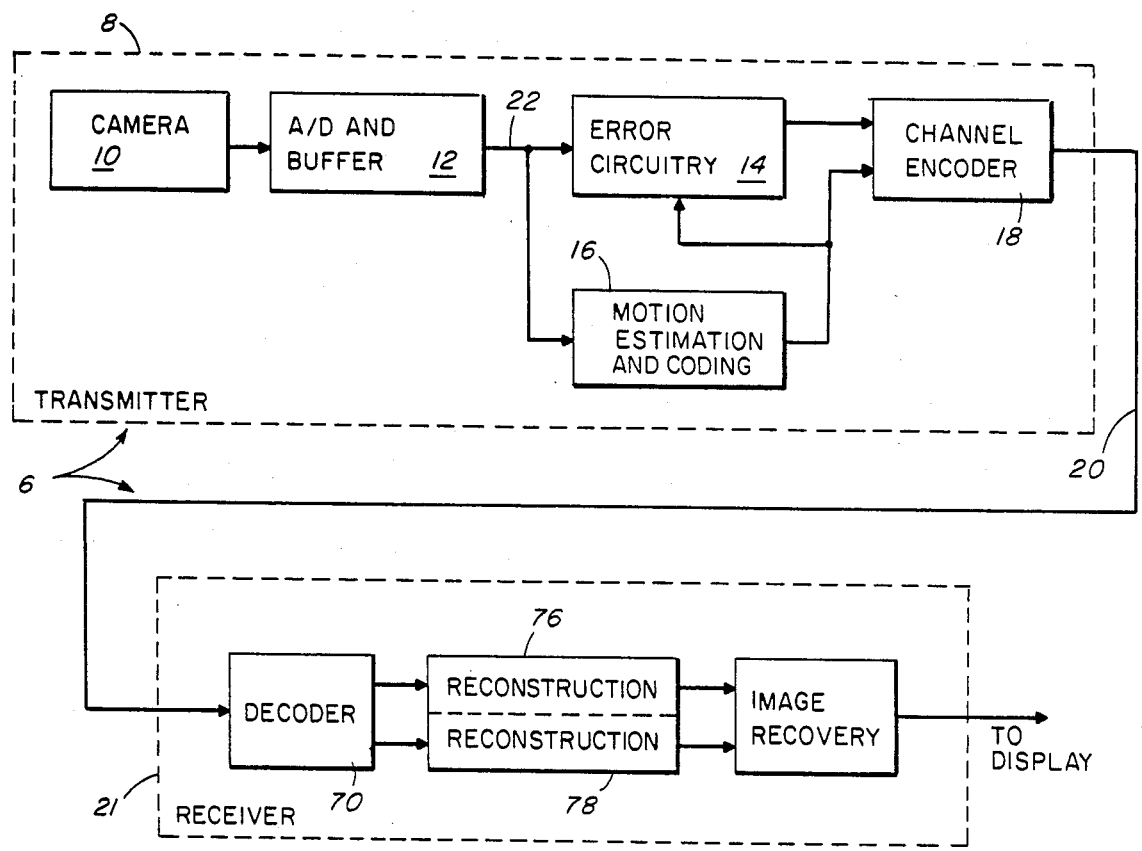
FIG. 1 is an electrical block diagram of a typical image communications system in accordance with the claimed invention.

Referring to FIG. 1, a communications system 6 has a transmitter 8 which, in accordance with a preferred embodiment of the invention, has a camera 10 for providing a video signal to an analog-to-digital converter and frame buffer 12. The frame buffer portion of the analog-to-digital converter and frame buffer 12 is capable of storing a full frame of the video, sampled to, for example, eight bits across a 256×240 pixel raster.

The entire coding and motion compensation process takes place in the digital domain. The transmitter has an error signal circuitry 14 and a motion estimation and coding circuitry 16. A channel encoder 18 codes the outputs of the error circuitry 14 and motion estimation and coding circuitry 16 and passes the thus encoded data onto a channel 20 for transmission to a receiver 21.

Figure 2:
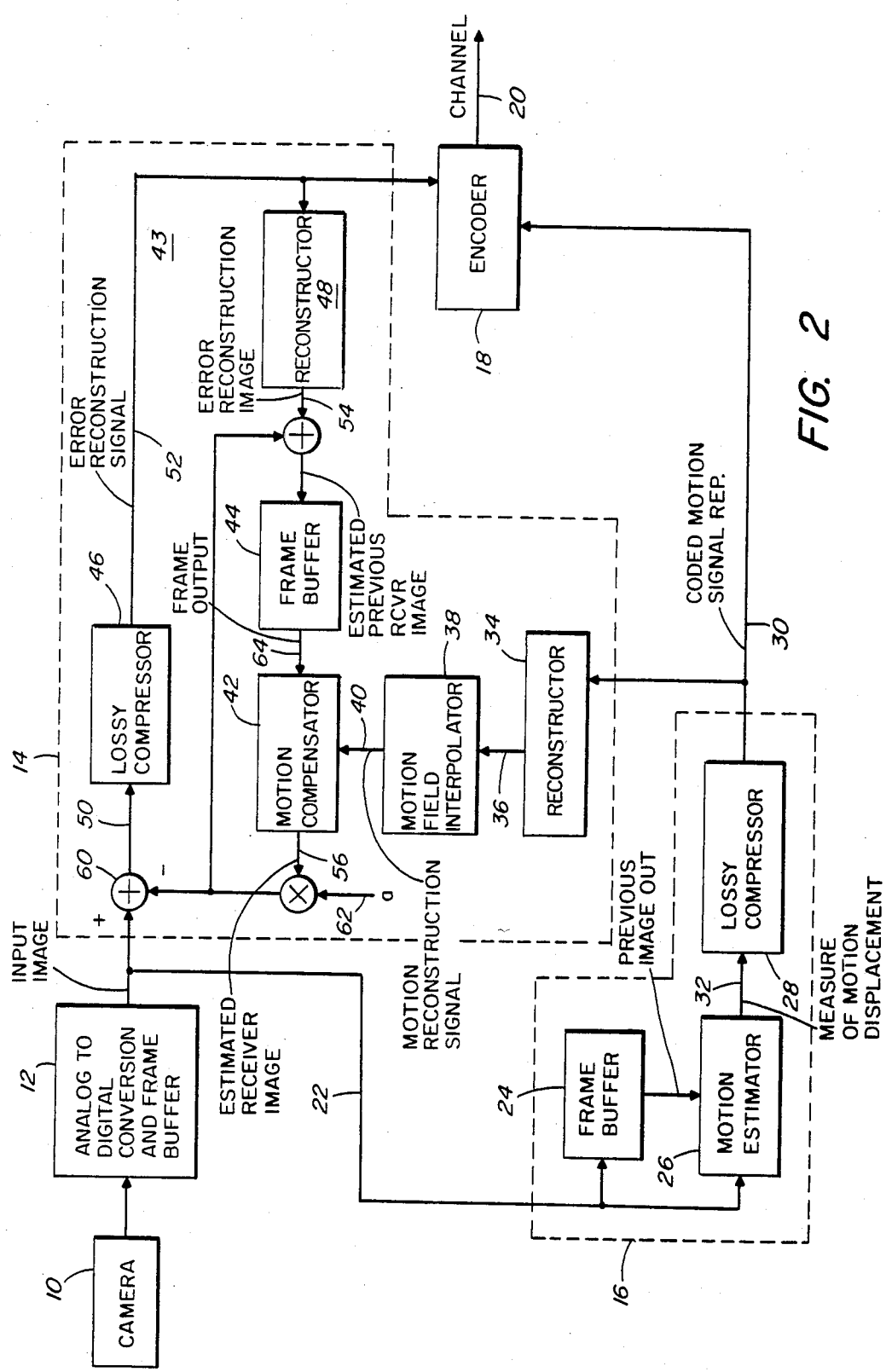
FIG. 2 is an electrical block diagram of the transmitter of a motion-compensated image encoding apparatus in accordance with the invention.

The illustrated motion estimation and coding circuitry 16 of FIG. 1, in accordance with a preferred embodiment of the invention, and referring to FIG. 2, compares a present original input frame image, available over lines 22, with the previous original input image, available in this illustrated embodiment from a frame buffer 24. A motion estimator circuitry 26 generates a measure of the motion displacement between the frames input thereto, and can be any of a number of motion estimation devices as are well known in the art. In a preferred embodiment to be described hereinafter, the motion estimation device uses an adaptive steepest descent error minimization method to generate the motion displacement measures.

The output of the motion estimator 26 is a field of "motion vectors" which, as noted above, provide a measure of the motion displacement between input frames. This vector field provides a description of how to map a previous input frame or input image from buffer 24 into the best approximation of the present input frame or image over lines 22. By "best" is meant an error metric such as, for example, a mean-squared-error error measure. Typically, the motion estimator uses a region matching technique between non-overlapping blocks of the previous and present input images. Should motion occur for a region in the previous image, the estimator will determine which block in the present image is the best match for the block in the previous image, and the value of the displacement is the difference between a new coordinate pair for the block in the present image and the original coordinate pair for the block in the earlier image. That determination provides the motion vector to be associated with the block in the previous image.

Since scenes are generally composed of several large objects moving uniformly over time, there is a high degree of correlation in the motion vector field. To avoid transmitting redundant information, and to reduce the data bit requirements, the preferred embodiment of the invention modifies the motion vector field, thereby losing some information, to facilitate the compression of the motion representing data. In the illustrated embodiment, this operation is represented by a "lossy compressor" 28 which reduces the amount of data, and hence the bandwidth, required to represent the motion vector field. Noting the similarity between motion vector field and natural images, predictive, transform, or interpolative coding of the two independent components of the vector field can be employed by the lossy compressor 28.

Thus the lossy compressor circuitry 28 is employed for coding the motion vector field available over lines 32, and provides, over lines 30, a coded motion signal representative of the motion vectors. This output of the lossy compressor, as noted above, will not, upon decoding, exactly reproduce the signals over lines 32 (which provide the measure of motion displacement) and, therefore, have some error signal associated with them. Nevertheless, the reduction in the data requirements of a lossy compressor, when compared to, for example, a PCM exact coding method, are so substantial, that the use of a lossy compressor is a significant advance in the art. One preferred lossy compression circuitry employs a discrete cosine transform and the circuitry incorporates a processing method described in co-pending application, U.S. Ser. No. 740,806, entitled Method and System for Adapting a Digitized Signal Processing System for Block Processing With Minimal Blocking Artifacts and filed on even data herewith. The inventor is Henrique Malvar. That application, assigned to the assignee of the present application, is incorporated herein, in its entirety, by reference.

The output of the lossy compressor circuitry over lines 30, as noted above, is passed to the encoder 18. In addition, those signals are employed by the error circuitry 14 for determining what the receiver would have seen, absent any errors in the channel, and thereby providing the mechanism for determining the error reconstruction signal, that is, the signal representing the difference between what the receiver would have predicted based upon the coded motion signal representation over lines 30, and the true image input.

The output of the lossy compressor over lines 30 is used by a reconstructor circuitry 34 for producing, at its output, a signal representative of the measure of motion displacement, the motion vectors, on lines 32. The difference between the signals over lines 36, the output of the reconstruction circuitry, and the signals over lines 32, represents the coding error introduced by the lossy compression apparatus 28. The output of the reconstruction apparatus 34, over lines 36, is directed to a motion field interpolation circuitry 38 which operates in the spatial domain to associate with each picture element a motion displacement vector. Thus, while the input signals over lines 36 represent motion displacements for groups or regions of elements, for example, the picture elements of a 4×4 block, the motion field interpolator, as described in more detail below, resolves that data so that there is associated with each picture element, a motion displacement vector. The resulting output of the motion field interpolator, over lines 40, is designated the motion reconstruction signal.

The motion reconstruction signal is applied to a motion compensation apparatus 42 which forms part of an error reconstruction loop 43. The error reconstruction loop includes a frame buffer 44, a lossy compression circuitry 46, and a reconstruction circuitry 48. The input to the lossy compression circuitry 46, over lines 50, is the error signal which is to be transmitted to the receiver. That error signal is coded to reduce its bandwidth and the resulting signal, the error reconstruction signal over lines 52, is delivered to the channel encoder 18. The lossy compressor 46 can be any of the two-dimensional block encoders such as a transform or DPCM encoder, and is preferably the encoder described in Malvar's co-pending application Ser. No. 740,806, referred to above. The error reconstruction signal is also sent to the reconstruction apparatus 48 which provides the inverse operation of the lossy compressor 46. There results, therefore, at the output of the reconstruction apparatus 48, an error reconstruction image over lines 54. The error reconstruction image is added to the expected output of the motion compensator, (which is the estimated receiver image over lines 56) and the resulting signal, an estimated previous receiver image (the predicted receiver image for the previous frame), is stored in the frame buffer 44.

The estimated receiver image is also applied to a differencing apparatus 60 which takes the difference between what the receiver is expected to predict, the signal over lines 56, and the actual image available from A-D converter and frame buffer 12. The output of the differencing apparatus 60 is the error signal input to the lossy compressor 46 over lines 50. If desired, a "leak" constant, "a", can be used to multiply the output of the motion compensator over lines 56 by a factor less than or equal to 1. This factor, a, is indicated at 62 and provides for gradually eliminating the effect of errors in the channel.

As noted above, the input to the frame buffer 44 is the estimated previous receiver image. This receiver image, which takes into account all data received by the receiver, corresponds to the reconstructed receiver image for a frame. The image output from the frame buffer over lines 64 is the image which the motion compensation circuitry 42 modifies in accordance with the output of the motion field interpolator 38 over lines 40.

Figure 3:
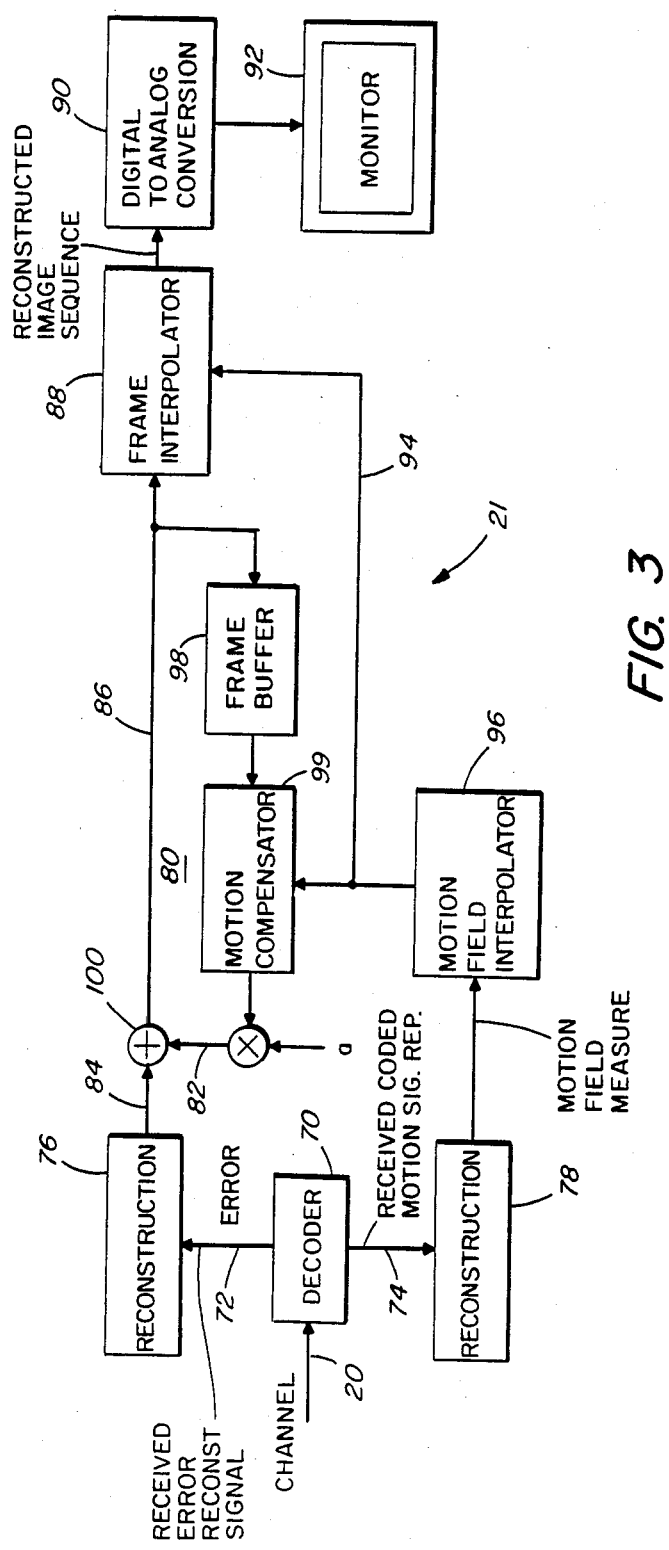
FIG. 3 is an electrical block diagram of the receiver of a motion-compensated image coding system for receiving the channel signals from the transmitter of FIG. 2.

At the receiver 21, referring to FIG. 3, the data from the channel is decoded by a channel decoder circuitry 70 and the resulting receiver error reconstruction signal over lines 72 and receiver coded motion signal representation over lines 74 are delivered to reconstruction circuitries 76 and 78 respectively. The output of the error reconstruction circuitry 76 is delivered to a recovery loop 80 in which motion compensating signals over lines 82 are added to the error image representation over lines 84 to produce a reconstructed receiver signal over lines 86. That signal is delivered to a temporal frame interpolator 88, which can add one or more frames between the successive received frames over line 86, for delivery to a digital-to-analog circuitry 90 and from there to a monitor 92 for viewing.

The frame interpolator 88 interpolates in the temporal domain in accordance with motion reconstruction signals received over lines 94. Those signals are generated by a motion field interpolator 96 corresponding to the motion field interpolator 38 of the FIG. 2. That motion field interpolator, as noted above, provides a motion vector for each picture element of the image and hence allows the frame interpolator to accurately predict what the image would have been at any selected time between received frames. The reconstructed receiver images over lines 86 are successively stored in a frame buffer 98 and are delivered to a motion compensator 99 which also receives signals from the motion field interpolator 96. The output of the motion compensator, representing the expected receiver image in the absence of an error correction, corresponds to the signal over lines 56 in the transmitter, and is delivered to the adder 100 for combination with the output of the error reconstruction circuitry over lines 84. As before, the output of the motion compensator circuitry can be modified by a "leak" parameter, a, whereby the effects of errors in the channel can be slowly eliminated. (The "leak" parameters, a, for both the transmitter and receiver must be identical in value.)

Figure 4:
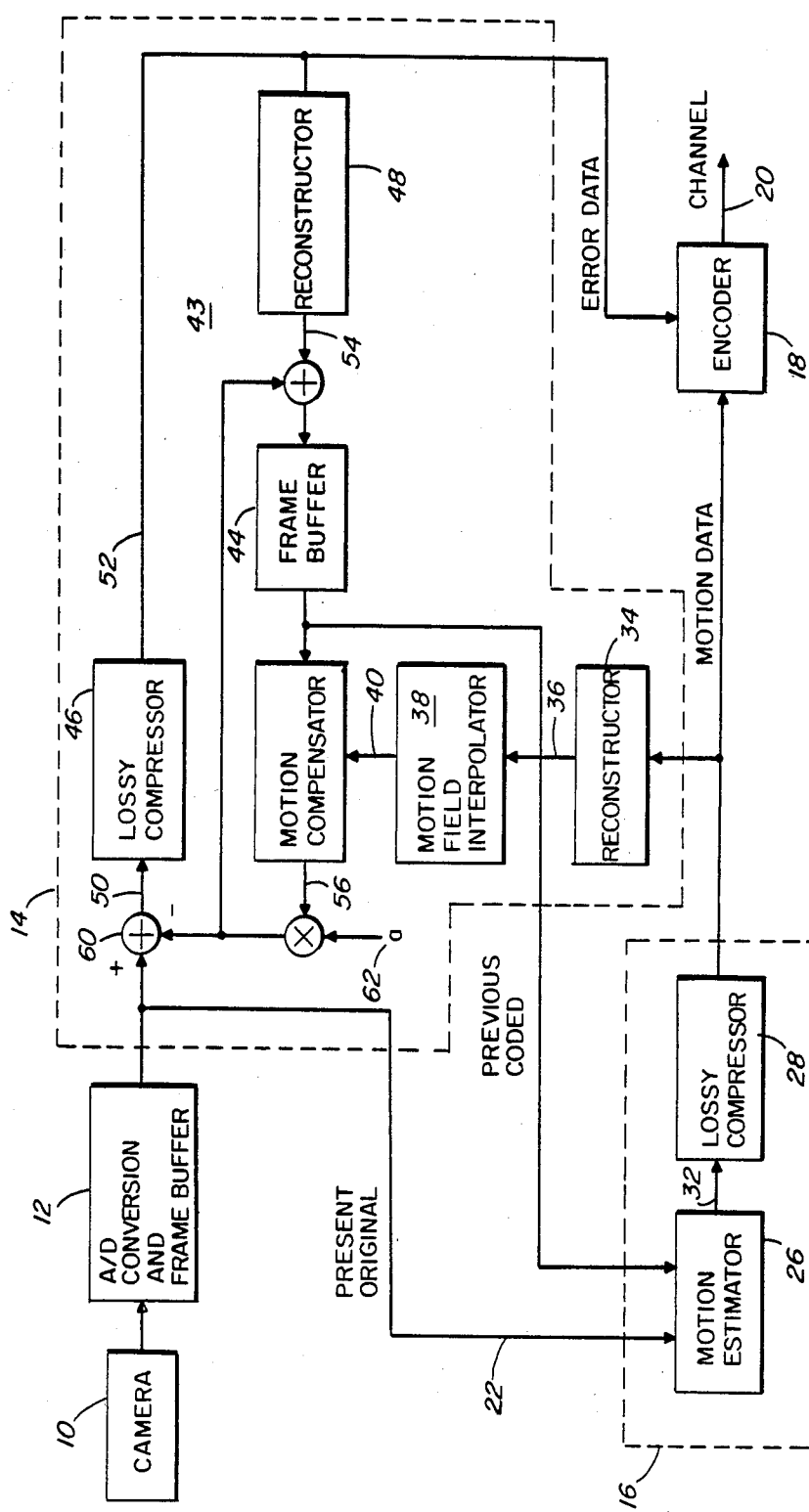
FIG. 4 is an electrical block diagram of an alternate transmitter utilizing a closed loop motion-compensated image coding system in accordance with the invention.

Referring to FIG. 4, in an alternative embodiment of the invention, the motion estimation circuitry 26 can receive an input image corresponding to the previous frame, not from the frame buffer 24 which provides an open loop circuitry, but from the frame buffer 44 to provide closed loop operation. In certain aspects of operation, such closed loop operation is effective for reducing overall error. This, however, is not always true. The alternate input to the motion estimation circuitry 26 is, in the FIG. 4 embodiment, the predicted reconstructed, previous frame output at the receiver.

Figure 5:
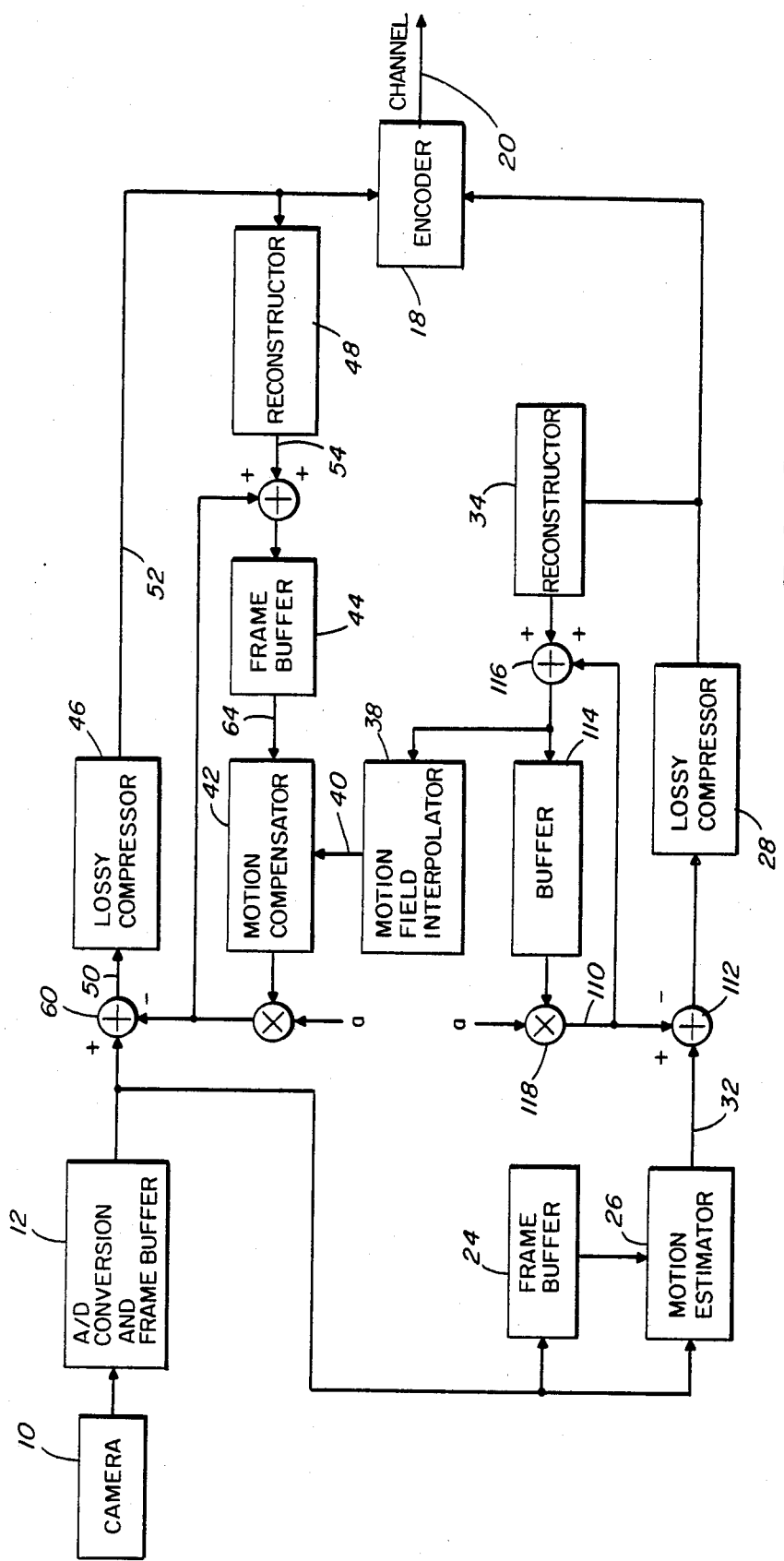
FIG. 5 is an electrical block diagram of the transmitter of a motion-compensated image coding system which utilizes temporal DPCM coding of the motion data in accordance with the invention.

Referring now to FIG. 5, the transmitter can employ a temporal differential pulse code modulation of the output of the motion estimator circuitry 26. In this illustrated embodiment, the lossy compressor input is no longer received directly from the motion estimator circuitry 26 as in the FIG. 2 embodiment, but instead is a differential signal corresponding to the difference between the estimated reconstructed signal for the previous frame, available over lines 110, and the present motion displacement vector signal over lines 32. These two signals are differenced at an adder 112 and that difference is passed to the lossy compressor circuitry 28, operating as described in connection with FIG. 2. The output of the reconstruction circuitry 34 is modified, in this illustrated embodiment, by the previous output of the reconstruction circuitry as is available from a buffer circuitry 114. These two signals are added at 116. The output from adder circuitry 116 is a coded motion signal representation corresponding to that available in the illustrated FIG. 2 embodiment over lines 36. The loop can compensate for channel error using the multiplication circuitry 118 having a "leak" parameter, a, which can range between 0 and 1.

Figure 6:
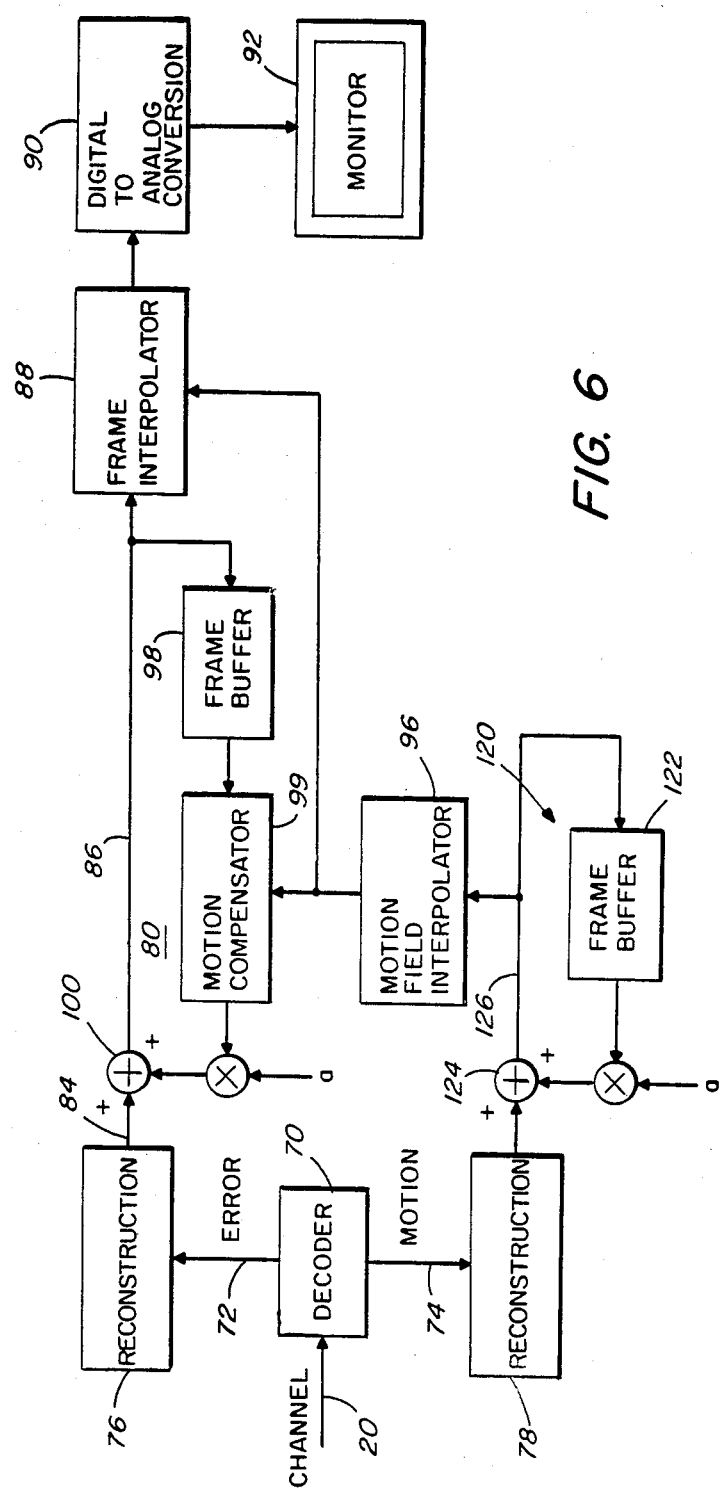
FIG. 6 is an electrical block diagram of the receiver of a motion-compensated coding system utilizing temporal DPCM coding of the motion data in accordance with the invention.

Referring to FIG. 6, the receiver structure for the transmitter of FIG. 5 employs a differential loop 120 having a frame buffer 122 for storage of the reconstructed motion displacement vector signals from reconstruction apparatus 78. The receiver, thus, adds, using an adder 124, to the output of the reconstruction circuitry 78, the previous motion displacement vector which is stored in buffer 122. The result, over lines 126, is directed to the motion field interpolator 38. As before, a "leak" parameter, a, can be employed to remove, over time, channel errors in the reconstruction signal.

The Motion Field Interpolator (38, 96)

Figure 7:
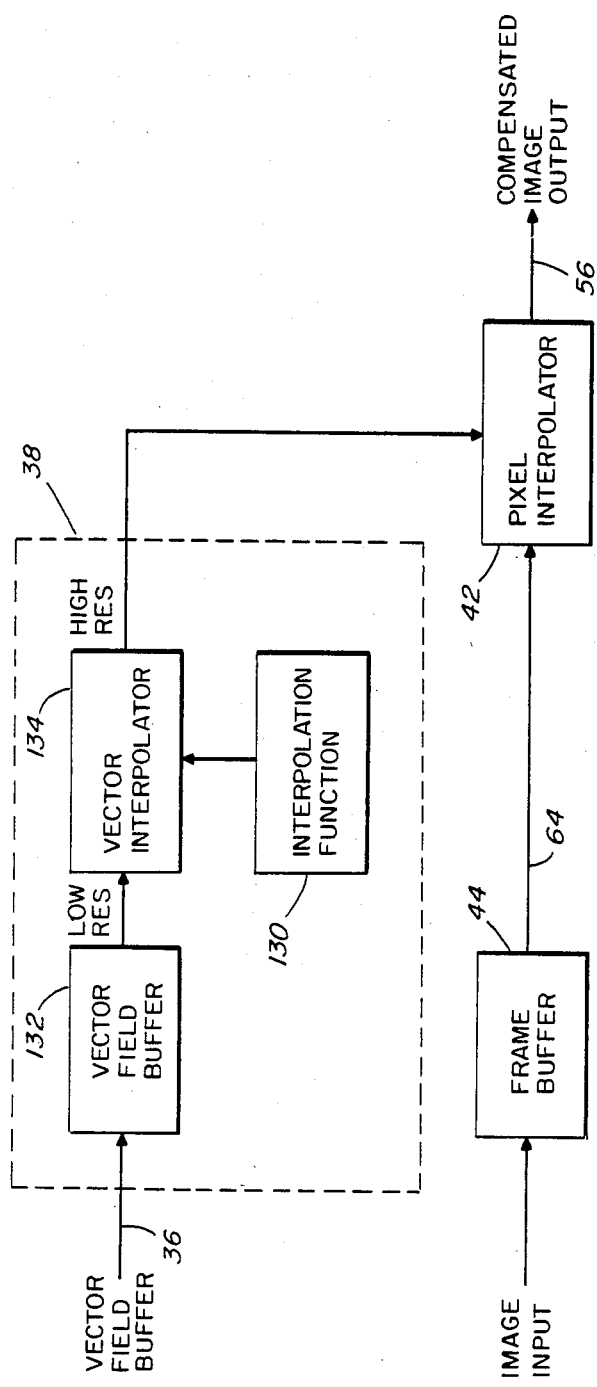
FIG. 7 is an electrical block diagram of a motion-compensation apparatus for a field of undersampled motion vectors in accordance with the preferred embodiment of the invention.

Referring to FIG. 7, the motion field interpolator 38 receives from the reconstruction circuitry 34, a motion displacement vector over lines 36 for each block region of the image. For example, for a color television video signal, a typical luminance image can have a block size of $8 \times 8$ pixels while a typical chrominance image can have a block size of $4 \times 4$ pixels. The motion field interpolator, employing a selected interpolation method, then associates with each pixel of the frame, an interpolated motion vector displacement value.

In accordance with the preferred aspect of the invention, a raised cosine interpolation function is employed for associating with each pixel a displacement value. The interpolation function is stored at 130. The input vector field is stored in a buffer 132 and has a low resolution corresponding to the block size.

Figure 8:
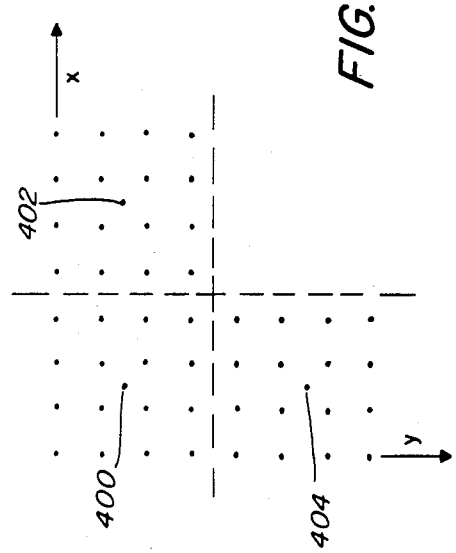
FIG. 8 is a diagrammatic representation of the spatial interpolation process according to the invention.

Thus, in accordance with this aspect of the invention, each displacement vector from reconstruction circuitry 34 is associated with the center of a multi-pixel region. Thus, for a $4 \times 4$ block region, referring to FIG. 8, the interpolation vectors are associated with a center position, that is, positions 400, 402, 404 which are not, for a $4 \times 4$ block, associated with any one picture element. The interpolation process, performed by a vector interpolator 124 operates in both the X and Y directions. Thus, the displacement vector associated with the $4 \times 4$ pixel block region centered at 400 and the corresponding displacement vector associated with the region centered at 402, for example, can be interpolated with respect to the X direction, while the displacement vectors at regions centered at 400 and at 404 can be employed with respect to a Y interpolation. In general, the interpolation process employs a plurality of displacement vectors surrounding a point of interest for deriving the value of the displacement vector at the point. Thus, an X and Y interpolated displacement vector value is assigned by the vector interpolator 124 in accordance with the interpolation function being used for each pixel of the image. In other embodiments of the invention, interpolation functions other than the raised cosine can be employed. For example, a linear interpolation function, or a trapezoidal shaped interpolation function can be employed, the latter for reducing the computational load.

The output of the transmitter motion field interpolator 38, or the receiver motion field interpolator 96 (which operates in a manner identical to that of interpolator 38,) is directed to the full motion compensation circuitry 42 in the transmitter and to the full motion compensation circuitry 80 and frame interpolation circuitry 88 in the receiver. The full motion compensation circuits 42 and 80, using incoming frame image data from frame buffers 44 and 98 respectively and the motion field interpolator output data, produce, in the transmitter, the estimated receiver image over lines 56, and in the receiver, the received estimated image over lines 82. The motion compensation circuitry maps each output pixel location to a location in the previous frame as indicated by the displacement vector value associated with that output pixel location. The displacement vectors are specified by the motion field interpolation circuitry associated therewith. In particular, referring to FIG. 7, this is the output of vector interpolator 134.

There results, however, for some coordinate locations of the new image field, a mapping from pixel coordinates in the previous frame which do not fall upon a grid location. That is, the interpolated motion displacement vector may call for a movement of, for example, 1¼ picture elements. In these instances, the motion compensation apparatus employs a spatial (or pixel) interpolation, for example a linear spatial interpolation of the 2×2 block of pixels surrounding the non-integer location, for determining a pixel value from the previous frame. Other interpolation functions could, of course, be employed, for example, the value selected for the non-integer coordinate of the previous frame can be the value of the pixel closest thereto. Alternately, a raised cosine interpolation function can be employed.

In the illustrated embodiment of the invention, the receiver also employs the output of motion field interpolator to create one or more frames between those which are actually transmitted. In accordance with this aspect of the invention, the temporal frame interpolator 88, in the illustrated embodiment, receives the values of the motion field interpolation circuitry to determine the image values for a frame positioned in time, in the particular illustrated embodiment, one-half the distance between the transmitted and received frames. In the illustrated embodiment, this function is performed by halving the output displacement vectors from the motion field interpolator 96. Thus, if a picture element, from one transmitted frame to the next, were displaced two pixel positions in the X direction and 4 pixel positions in the Y direction, the temporal frame interpolator would provide an intermediate frame wherein that picture element was displaced one position in the X direction and two positions in the Y direction. In this manner, a frame half way between two received frames can be added to the picture image sequence to provide a better visual rendition.

The motion field interpolator 38 and motion compensator 42 can be implemented in hardware, in software, or in a combination of hardware and software.

The Lossy Compressor

In accordance with a preferred embodiment of the invention, the lossy compression circuitry 28 can be any of a plurality of a circuitries. For example, the lossy compression circuitry can use transform coding, can employ differential pulse code modulation, or any other lossy coding method. The output of the motion estimation circuitry 26 has the appearance, in essence, of a highly correlated image wherein each picture element represents not a portion of a visual image but, rather, a displacement value. According to the preferred embodiment of the invention, a block transform encoding method is employed for coding the motion estimation output signal.

In the illustrated embodiment of the invention, the lossy compression circuitry can be a discrete cosine transform operating on the displacement vector output of the motion estimation circuitry 26 to provide coefficient data which is then adaptively quantized in accordance with a Max Quantizer as is well known in the art. In this circumstance, the reconstruction circuitry 34 then becomes the inverse discrete cosine transform as is well known in the art.

In other embodiments of the invention, the lossy compression circuitry 28 can be embedded in a differential pulse code modulation circuitry for example, that described in connection with FIG. 4. In this instance, the temporal differential pulse code system employs a pulse code modulation coder of limited bit structure, and it is this lossy coder which provides the errors which are compensated for by the system as described hereinabove.

In yet another aspect of the invention, and as described the above-noted co-pending application U.S. Ser. No. 740,806, filed in the name of Henrique Malvar, on even date herewith, and assigned to the assignee of this invention, preprocessing techniques can be employed for improving even more upon the transform method described hereinabove, to substantially eliminate the block coding artifacts. In still another embodiment of the invention, the lossy compressor can be implemented using a short-space fourier transform, such as that described in U.S. Application Ser. No. 713,478, filed on Mar. 19, 1985, for a Method and Apparatus for Multi-Dimensional Signal Processing Using a Short-Space Fourier Transform, and assigned to the assignee of the present invention. The disclosure and specification of the above identified United States patent applications are incorporated herein by reference.

The Motion Estimator

Figure 9:
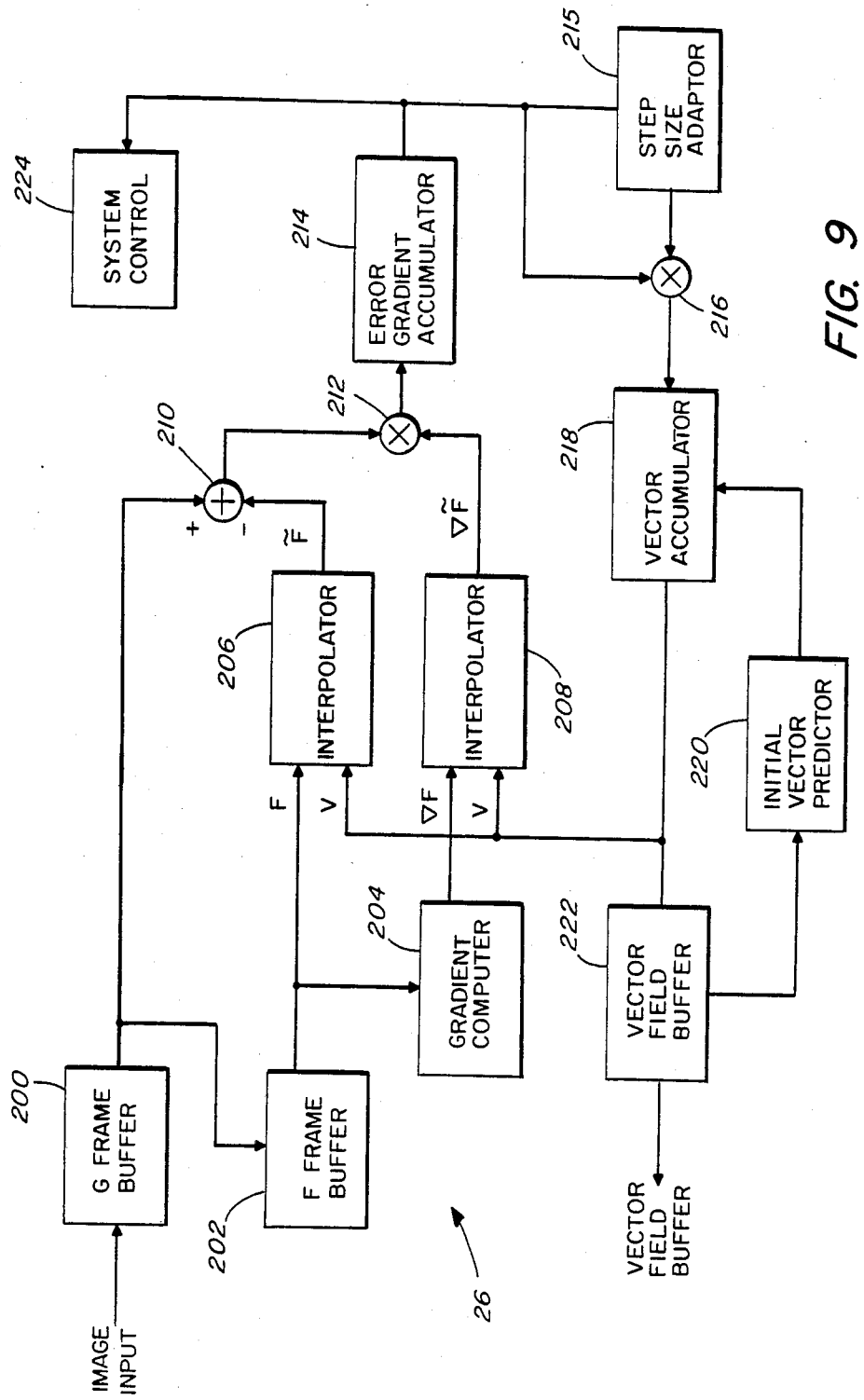
FIG. 9 is an electrical block diagram of an iterative spatial-domain motion estimation apparatus utilizing adaptive, steepest descent error minimization.

Referring now to FIG. 9, in accordance with the illustrated embodiment, the motion estimation circuitry 26 employs an iterative spatial domain approach which quickly converges through an error minimization process for determining the displacement vectors of an input signal. In the preferred embodiment, an adaptive, steepest descent approach method is employed. The method has good convergence behavior.

The theoretical background for various aspects of the invention described and claimed herein are described in a Master's degree thesis of the inventor, the thesis was submitted to the Massachusetts Institute of Technology in partial fulfillment of the requirements of the degree of Master of Science. The thesis provides theoretical basis for, inter alia the illustrated motion estimator 26, and it is sufficient to concentrate here on Equation 3.12, in the thesis, which describes the iterations for determining a displacement vector v for a pixel having a location p in an image f. The new image is represented by g. That equation is reproduced herein as Equation 1 where the "i" represents an earlier value of the displacement vector and "i+1" represents a next value of the displacement vector.

$$\underline{V}^{i+1} = \underline{V}^i - 2e \sum_{\underline{p}} [g(\underline{p}) - f(\underline{p} - \underline{v}^i)] \nabla_{(.)} f(\underline{p} - \underline{v}^i) \quad \text{(Equation 1)}$$

Equation 1 can be implemented in accordance with FIG. 9 where the input g and f frames are stored in buffers 200 and 202 respectively. The gradient value of the f frame is determined by a gradient computer 204 and spatial interpolators 206, 208 provide the values of f required by the summation in Equation 1. A summing element 210 and a multiplication element 212 yield the error gradient value which is accumulated in an accumulator 214. The output of the accumulator 214 is multiplied by a step size adaptor 215 at a multiplier 216; and the result is used to update the vector displacement value in an accumulator 218. The accumulator receives the initial vector prediction value from a prediction hardware 220.

The updated vectors are employed by interpolators 206 and 208 in determining the values of "f" and the vector output field is stored in a buffer 222. The entire apparatus operates under the control of a system controller 224 which monitors the value of the error gradient accumulator output and in response thereto adaptively changes the step size.

Figures 10, 11:
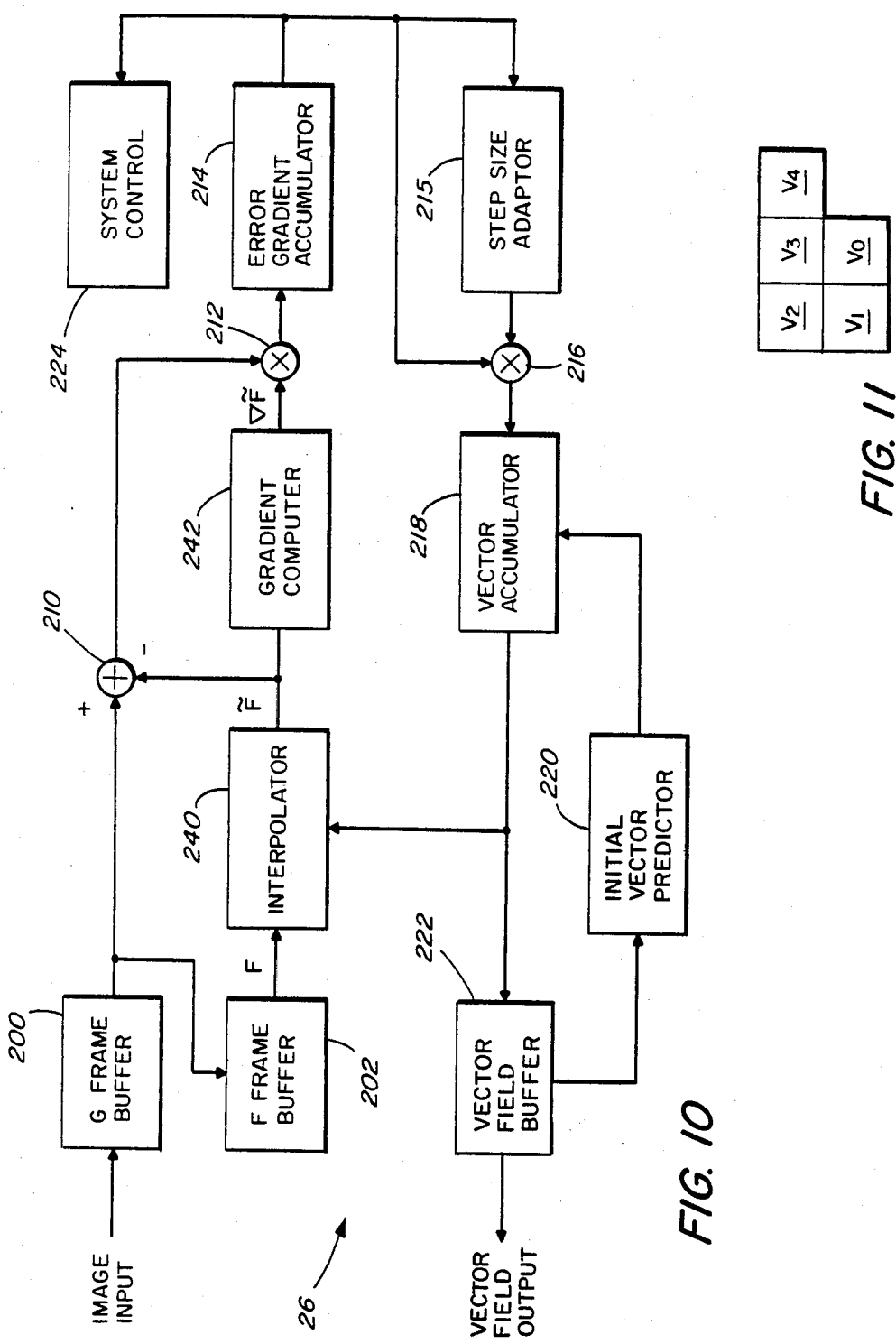
FIG. 10 is an electrical block diagram of an iterative spatial-domain motion estimation apparatus utilizing adaptive, steepest descent error minimization with an improved data processing structure.
FIG. 11 is a diagrammatic presentation of the relative locations of adjacent blocks used in predicting an initial displacement motion vector value.

Referring now to FIG. 10, an improved method for implementing the adaptive steepest descent error minimization iterative spatial-domain motion estimator 26, defined by equation 1, provides for use of a single interpolator 240 operating upon the f frame and a gradient computation circuitry then operating upon the interpolated value output of interpolator 240. There results from this circuitry the elimination of one of the FIG. 9 interpolators thus providing a savings of hardware and/or software.

In employing this method, the three important parameters are the initial step size, e, the stopping or cutoff threshold, T, and the predictor set, $a_k$. The initial step size plays an important role in determining the rate at which the method converges upon the motion vector displacement. When e is chosen to have a very small value, the method requires an excessive number of iterations before reaching a sufficiently small neighborhood of the minimum. As the value of e increases, the rate of convergence also increases but there comes a value when e is so large that the search procedure will oscillate about the minimum without converging. The value of e must be determined by empirical tests. For a block size of $4 \times 4$, a value of $3 \times 10^{-5}$ has been found to provide the best convergence behavior.

The cut-off threshold is compared to the magnitude of the error gradient times the initial step size, e, for each iteration. This threshold must be chosen with two constraints in mind. First, it should be sufficiently small so that a displacement close to the actual displacement is reached. The second and opposing constraint is that as the threshold decreases, the number of required iterations increases dramatically. Thus, as with the step size, the appropriate cut-off threshold must be found empirically. (When the step size varies, as described below, the threshold, T, as defined above continues to be compared against the multiplicative product of the initial step size, e, and the error gradient.)

In determining the cutoff threshold empirically, two indicators are of interest. They are the average number of iterations per block and the motion compensated frame difference energy. In order to find the best value of T, the estimation and compensation process is run several times. Starting with a small cut-off threshold, a minimal value of the motion compensated frame difference energy is determined. As the threshold is increased, the average number of iterations steadily drops while the motion compensated frame difference energy remains essentially constant. Eventually, however, a value of the threshold is reached at which the estimated displacements become inaccurate and the motion compensated frame difference energy begins to rise. In seeking the point of inflection in the motion compensated frame difference energy as a function of T, a value of $7 \times 10^{-3}$ was found to be most appropriate. This threshold corresponds to a minimum vector update of $7 \times 10^{-3}$ pixels.

The selection of the predictor coefficients affects both the average number of iterations and the motion compensation frame difference energy.

The selection of the initial value of the displacement vector for each block is, in the illustrated embodiment, chosen as a linear combination of displacement vectors adjacent thereto. Thus, referring to FIG. 11, the steepest descent method provides access to the displacement vectors above and to the left of a present displacement vector $\underline{V}_o$. Thus, in accordance with the illustrated embodiment, the present displacement vector is defined by equation 2 as:

$$\underline{V}_o = \sum_{j=1}^{4} a_j \underline{V}_j \quad \text{(Equation 2)}$$

The $a_j$ are the predictor coefficients while the $\underline{V}_j$ are the previously determined displacement vectors.

The preferred vector predictors, $a_j$, are: $a_1 = 0.3$, $a_2 = 0$; $a_3 = 0.4$ and $a_4 = 0.3$. For these values of the vector predictors, in combination with the step value and threshold values noted above, for one set of data, the average number of iterations was 6.71, and the motion compensation frame difference energy was 14.1 dB's lower than the non-motion compensated frame difference energy.

In accordance with a preferred embodiment of the invention, the selected value of e, the initial step size, can be adapted to change as a function of the error gradient. Thus, according to this illustrated embodiment of the invention, and under the control of the system controller 224, the step size value is adapted to change, depending upon the present gradient error value, or the present and one or more previous error gradient values, so that the step size for the vector displacement does not become unreasonably small. A description of two methods for selecting step size is provided in the thesis noted supra.

According to the preferred embodiment of the invention, the second method, defined by Equations 3.18, 3.19 and 3.20 of the thesis noted supra, is modified to reduce the processing load of the system. In this embodiment, the equations 3.18, 3.19, 3.20 are modified so that:

$$\text{(new step size)} = \text{(old step size)} \cdot \alpha \quad \text{(Equation 3)}$$

$$\alpha = \begin{cases} 1.4 \text{ if } R > 0 \\ 0.3 \text{ if } R < 0 \end{cases} \quad \text{(Equation 4)}$$

where

-continued
$$R = [\text{Gradient } E(V_x^i)] \cdot [\text{Sign } [\text{Gradient } E(V_x^{i-1})]] + \\ [\text{Gradient } E(V_y^i)] \cdot [\text{Sign } [\text{Gradient } E(V_y^{i-1})]]$$

and "Gradient E" represents the gradient of the present x or y error function, and "Sign[·]" equals ±1 depending upon the sign of the argument. Equation 4, thus defined, provides a third method for an adaptive steepest descent approach. As noted above, however, the cutoff threshold value, T, is measured against the initial step size. Thus, the illustrated T can be defined as the product of a constant times the error gradient.

Further, in accordance with the preferred embodiment of the invention, the system controller 224 also prevents the displacement increment step size from being greater than a selected threshold, for example, greater than one pixel, and further prevents the maximum value of the displacement vector from being greater than a second selected threshold, for example greater than 7½ pixels. In this manner, more control of the steepest descent process is available and singularities which prevent convergence can be avoided.

The illustrated motion estimator can be implemented in hardware, in software, or in a combination thereof.

Additions, subtractions, deletions, and other modifications of the preferred particular embodiments of the invention will be apparent to those skilled in the art and are within the scope of the following claims.

What is claimed is:

1. An image sequence transmission apparatus for transmitting a sequence of images over a communications channel, said apparatus comprising
   means for estimating, for successive images of the sequence, a measure of the motion displacement of block regions of an image,
   coding means for representing said generated measures of an image as a coded motion signal representation,
   means for generating, using said coded motion signal representation and an estimated previous receiver image, an error reconstruction signal, and
   means for transmitting said coded motion signal representation and said error reconstruction signal over said channel,
   wherein said error reconstruction signal generating means includes an improved error signal generating means comprising
   A. a motion reconstruction means for generating motion reconstruction displacement signals for each said block in response to said coded motion signal representation,
   B. a motion field interpolation means for generating a displacement vector in response to said displacement signals for each picture element of said image, and
   C. a motion compensation means responsive to said motion field interpolation means for modifying said receiver estimated previous image for constructing an estimated receiver image.

2. The improved error signal generating means of claim 1 wherein said motion field interpolation means comprises
   means for interpolating between said block displacement signals using a raised cosine interpolation function.

3. The improved error signal generating means of claim 1 wherein said motion field interpolation means comprises
   means for linearly interpolating between said block displacement signals of said reconstruction means.

4. The improved error signal generating means of claim 1 wherein said motion field interpolation means comprises
   means for interpolating between said block displacement signals using a trapezoidal interpolation function.

5. An image sequence communications apparatus for communicating a sequence of images over a communications channel, said apparatus comprising
   a transmitter having
   means for estimating, for successive images of the sequence, a measure of the motion displacement of block regions of an image,
   coding means for representing said generated measures of an image as a coded motion signal representation,
   means for generating, using said coded motion signal representation and an estimated previous receiver image, an error reconstruction signal, and
   means for transmitting said coded motion signal representation and said error reconstruction signal over said channel, and
   a receiver having
   means for constructing an error image representation from a received error reconstruction signal,
   means for constructing a motion field measure from a received coded motion signal representation, and
   means responsive to said received error image representation and said receiver motion field measure for generating a reconstructed image sequence,
   wherein said error reconstruction signal generating means includes an improved error signal generating means comprising
   A. a motion reconstruction means for generating motion reconstruction displacement signals for each block in response to said coded motion signal representation,
   B. a transmitter motion field interpolation means for generating, in response to said displacement signals, a displacement vector for each picture element of a said image, and
   C. a motion compensation means responsive to said motion field interpolation means for modifying said receiver estimated previous image for constructing an estimated receiver image, and
   wherein said reconstructed image sequence generating means includes an improved receiver generating means comprising
   D. a receiver motion field interpolation means for generating, in response to said received coded motion signal representation, a displacement vector for each picture element of an image to be constructed, and
   E. a received motion compensation loop means responsive to said motion field interpolator and said error reconstructing means for generating an image sequence.

6. The apparatus of claim 5 wherein each of said transmitter and receiver motion field interpolation means includes
   means for interpolating between said block displacement signals using a raised cosine interpolation function.

7. The apparatus of claim 5 wherein each of said transmitter and receiver motion field interpolation means includes means for linerarly interpolating between said block displacement signals of said reconstruction means.

8. The apparatus of claim 5 wherein each of said transmitter and receiver motion field interpolation means includes means for interpolating between said block displacement signals using a trapezoidal interpolation function.

9. An image sequence transmission method for transmitting a sequence of images over a communications channel having the steps of estimating, for successive images of the sequence, a measure of the motion displacement of block regions of an image, representing said generated measures of an image as a coded motion signal representation, generating, using said coded motion signal representation and an estimated previous receiver image, an error reconstruction signal for said image, and transmitting over the channel the coded motion signal representation and the error reconstruction signal, wherein said error reconstruction signal generating step includes an improved error signal generating method comprising the steps of A. generating motion block reconstruction displacement signals in response to the coded motion signal representation, B. interpolating, in response to said block reconstruction displacement signals, a displacement vector for each picture element of said image, and C. constructing an estimated receiver image from the interpolated motion reconstruction signal and said receiver estimated previous image.

10. The improved error signal generating method of claim 9 wherein said motion field interpolation step comprises the step of interpolating between said block displacement signals using a raised cosine interpolating function.

11. The improved error signal generating method of claim 9 wherein said motion field interpolating step comprises the step of linearly interpolating between said block displacement signals of said reconstruction means.

12. The improved error signal generating method of claim 9 wherein said motion field interpolation step comprises the step of interpolating between said block displacement signals using a trapezoidal interpolation function.

13. An image sequence communications method for communicating a sequence of images over a communications channel including the steps of estimating, for successive images, a measure of the motion displacement of block regions of an image, representing said generated measures of an image as a coded motion signal representation, generating, using said coded signal representation and a receiver estimated previous image, an error reconstruction signal, transmitting said coded motion signal representation and said error reconstruction signal over said channel, constructing, at a receiver, an error image representation from a receiver error reconstruction signal, constructing, at the receiver, a motion field measure from a received coded motion signal representation, and generating a reconstructed image sequence from the receiver error representation and receiver motion field measure, wherein said error reconstruction signal generating step includes an improved error signal generating method comprising the steps of A. generating motion block reconstruction displacement signals in response to the coded motion signal representation, B. interpolating, in response to said block reconstruction displacement signals, a displacement vector for each picture element of said image, and C. constructing an estimated receiver image from the interpolated motion reconstruction signal and said receiver estimated previous image, and wherein said reconstructed image sequence generating step includes an improved receiver generating method comprising the steps of D. interpolating said received coded motion signal representation of said block displacements for generating a displacement vector for each picture element of an image to be constructed, and E. generating an image sequence from the interpolated motion field and the error representation.

14. The method of claim 13 wherein each said interpolating step comprises the step of interpolating between said block displacement signals using a raised cosine interpolation function.

15. The method of claim 13 wherein each said interpolating step comprises the step of linearly interpolating between said block displacement signals of said constructing process.

16. The method of claim 13 wherein each said interpolating step comprises the step of interpolating between said block displacement signals using a trapezoidal interpolation function.

* * * * *